(12) United States Patent
Tomko et al.

(10) Patent No.: US 9,195,746 B2
(45) Date of Patent: Nov. 24, 2015

(54) SEARCH SCRATCH PAD

(75) Inventors: Daniel Jason Tomko, Bellevue, WA (US); Vikas Rajvanshy, Redmond, WA (US); Michael Gradek, White Plains, NY (US); John Lynn, San Francisco, CA (US); William J. Pardi, Edgewood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/304,631

(22) Filed: Nov. 26, 2011

(65) Prior Publication Data

US 2013/0138631 A1    May 30, 2013

(51) Int. Cl.
*G06F 17/30*    (2006.01)
(52) U.S. Cl.
CPC ............... *G06F 17/30864* (2013.01)
(58) Field of Classification Search
CPC ............................................... G06F 17/30864
USPC .......................................................... 707/722
See application file for complete search history.

(56) References Cited

U.S. PATENT DOCUMENTS

| | | | |
|---|---|---|---|
| 7,181,444 | B2 | 2/2007 | Porter et al. |
| 7,353,246 | B1 * | 4/2008 | Rosen et al. ................ 709/202 |
| 7,680,781 | B1 | 3/2010 | Wasserman et al. |
| 2002/0080186 | A1 * | 6/2002 | Frederiksen ................ 345/808 |
| 2004/0267730 | A1 * | 12/2004 | Dumais et al. ................ 707/3 |
| 2008/0005105 | A1 * | 1/2008 | Lawler et al. ................ 707/6 |

OTHER PUBLICATIONS

Brown, et al., "DeckScape: An Experimental Web Browser", Retrieved May 19, 2011 at <<http://www.hpl.hp.com/techreports/Compaq-DEC/SRC-RR-135A.pdf>>, SRC Research Report, Mar. 1, 1995, 18 Pages.

Spoerri, Anselm., "Toward Enabling Users to Visually Evaluate the Effectiveness of Different Search Methods", Retrieved May 19, 2011 at <<http://citeseerx.ist.psu.edu/viewdoc/download?doi=10.1.1.86.6761&rep=rep1&type=pdf>>, Journal of Web Engineering, vol. 3, No. 3-4, Dec. 2004, pp. 297-313.

Havre, et al., "Interactive Visualization of Multiple Query Results", Retrieved May 19, 2011 at <<http://ieeexplore.ieee.org/stamp/stamp.jsp?tp=&arnumber=963287>>, IEEE Symposium on Information Visualization (InfoVis), 2001, 8 Pages.

(Continued)

*Primary Examiner* — Jensen Hu
(74) *Attorney, Agent, or Firm* — Jessica Meyers; Tom Wong; Micky Minhas

(57) ABSTRACT

A plurality of queries associated with a plurality of user query object submissions to a scratch pad application executing asynchronously as a background application to a first user application may be obtained. One or more search requests may be initiated to one or more search engines based on each one of the plurality of obtained queries. Cumulative search results of the one or more search requests may be obtained, the cumulative search results accumulated over the plurality of obtained queries. A set of accumulated results metadata may be obtained based on an analysis of the accumulated cumulative search results. A display of a summary of the cumulative search results based on a relevance analysis of the accumulated results metadata may be initiated.

20 Claims, 11 Drawing Sheets

(56) References Cited

OTHER PUBLICATIONS

Martin, et al., "Using Metadata to Query Passive Data Sources", Retrieved May 19, 2011 at <<http://ieeexplore.ieee.org/stamp/stamp.jsp?tp=&arnumber=649223>>, Proceedings of the Thirty-First Hawaii International Conference on System Sciences, Jan. 6-9, 1998, pp. 286-294.

Newfield, et al., "Scratchpad: Mechanisms for Better Navigation in Directed Web Searching", Retrieved May 19, 2011 at <<http://newfieldenterprises.com/publications/uist98.pdf>>, Eleventh Annual Symposium on User Interface Software and Technology, Nov. 1-4, 1998, 8 Pages.

Flake, Gary, "Refactoring the Search Problem", Retrieved Oct. 12, 2011 at <<http://www.sigir2010.org/documents/GaryFlake-SIGIR2010-RefactoringTheSearchProblem.pdf>>, ACM-SIGIR 2010, Jul. 2010, 43 pages.

"Metadata", Retrieved Oct. 12, 2011 at <<http://en.wikipedia.org/wiki/Metadata>>, Wikipedia, 12 pages.

"New Microsoft Live Labs Pivot Technology Brings Information to Life", Retrieved Oct. 12, 2011 at <<http://www.microsoft.com/presspass/features/2010/feb10/02-11pivot.mspx>>, Feb. 11, 2010, 3 pages.

"Tf-idf", Retrieved Oct. 12, 2011 at <<http://en.wikipedia.org/wiki/Tf%E2%80%93idf>>, Wikipedia, 4 pages.

\* cited by examiner

200b (2A)

---
212 — Receive the plurality of user query object submissions, each of the user query object submissions received via one or more of text entry in a text area displayed to a user, a drag and drop of one of the user query object submissions, audio input, image input, sensory input, or a paste operation of one of the user query object submissions based on a copy operation from the first user application that is different from the scratch pad application (2B)

214 — Receive the plurality of user query object submissions, the user query object acquisition component receiving user activation via one or more of a task tray icon activation, a right click indication, a left click indication, an audio request, or a user touch received via a context menu (2C)

216 — Determine a plurality of relevance indicators associated with portions of the search results associated with respective search operations associated with each one of the plurality of queries, the determination of the relevance indicators based on the accumulated results metadata (2D)

218 — The accumulated results metadata includes one or more of a plurality of titles of web pages, a plurality of text summaries associated with web pages, a plurality of static ranks associated with web pages, web page content associated with individual search results, or a plurality of indicators of last search engine scan dates associated with web pages

FIG. 2b

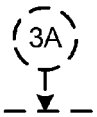

Initiating entry of the first topic object representing the first topic in the scratch pad application includes one or more of initiating text entry in a text area displayed to a user, a dragging and dropping of the first topic object from the first application to the scratch pad application, initiating audio input, initiating image input, initiating sensory input, or a paste operation of the first topic object based on a copy operation from the first application to the scratch pad application — 314

The displayed accumulated results include one or more of a Uniform Resource Locator (URL), a topic associated with a query result, a text summary, an image, audio data, an audio file selectable icon, or an image file selectable icon — 316

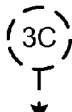

Request access to a search topic object entry display area associated with the scratch pad application via one or more of a task tray icon activation, a right click indication in a display area associated with the first application, a left click indication in a display area associated with the first application, an audio request, or a user touch received via a context menu — 318

FIG. 3b

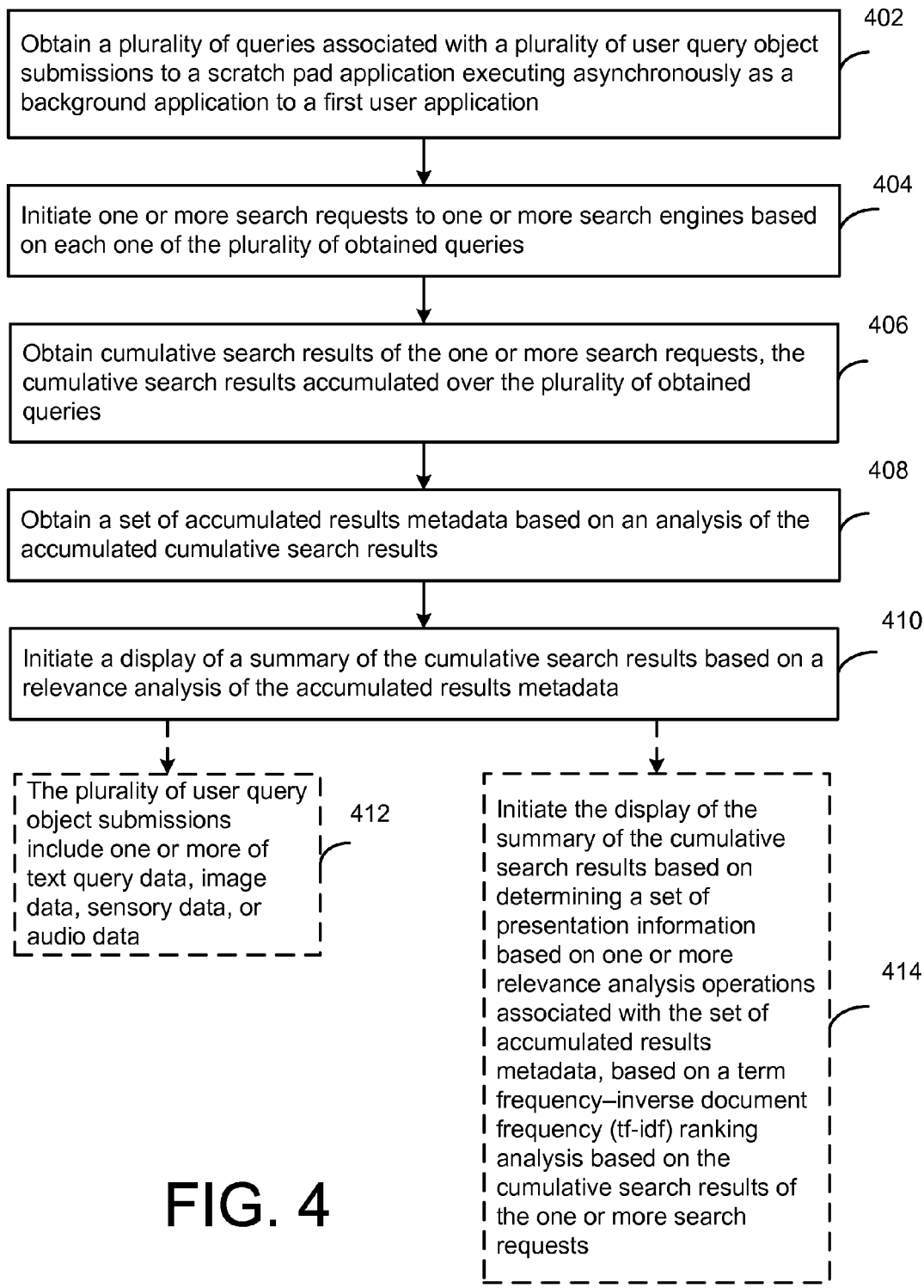

SEARCH SCRATCH PAD

BACKGROUND

Users of electronic devices are increasingly relying on information obtained from web searches as sources of news reports, ratings, item descriptions, announcements, event information, and other various types of information that may be of interest to the users. Further, users are increasingly relying on search results as part of their work in various tasks. For example, a user planning a trip may rely on search results relating to fights, hotels, car rentals, and restaurants. As another example, a user researching a paper topic may rely on search results relating to various aspects of the paper topic. With regard to each of these example tasks (e.g., planning a tip, researching a paper topic), the user may submit a large number of individual queries (e.g., flight queries, hotel queries, car rental queries, restaurant queries) to one or more search engines, and may spend many hours filtering and distilling the search results. For example, the user may pause his/her current work to submit a query, evaluate results, refine query text, synchronously iterating until the desired information is obtained before returning to the task at hand.

SUMMARY

According to one general aspect, a system may include a query determination component that determines a plurality of queries associated with a plurality of user query object submissions to a scratch pad application executing asynchronously as a background application to a first user application. The system may also include a scratch pad search component that initiates, via a device processor, one or more search operations based on each one of the plurality of obtained queries, the scratch pad search component executing asynchronously, in association with the background application, to the first user application. The system may also include a search results acquisition component that obtains cumulative search results of the one or more search operations, the cumulative search results accumulated over the plurality of obtained queries. The system may also include a metadata extraction component that obtains a set of accumulated results metadata based on an analysis of the accumulated cumulative search results.

According to another aspect, a first application may be initiated. A first topic associated with a first user interest may be determined. Entry of a first topic object representing the first topic in a scratch pad application that is different from the first application may be initiated, the scratch pad application executing asynchronously from the first application, in a first time interval in common with an execution session of the first application. A second topic associated with the first user interest may be determined. Entry of a second topic object representing the second topic in the scratch pad application may be initiated, in a second time interval in common with the execution session of the first application. A display of accumulated results may be obtained based on first search results of a first plurality of search operations based on the first topic object and second search results of a second plurality of search operations based on the second topic object entered in the scratch pad application, the first and second pluralities of search operations initiated via scratch pad application instructions executing in a background execution environment, based on entry operations associated with the entries of the respective first and second topic objects, the displayed accumulated results arranged based on a relevance analysis of a cumulative set of metadata extracted from the first search results and the second search results.

According to another aspect, a computer program product tangibly embodied on a computer-readable storage medium may include executable code that may cause at least one data processing apparatus to obtain a plurality of queries associated with a plurality of user query object submissions to a scratch pad application executing asynchronously as a background application to a first user application. Further, the at least one data processing apparatus may initiate one or more search requests to one or more search engines based on each one of the plurality of obtained queries. Further, the at least one data processing apparatus may obtain cumulative search results of the one or more search requests, the cumulative search results accumulated over the plurality of obtained queries. Further, the at least one data processing apparatus may obtain a set of accumulated results metadata based on an analysis of the accumulated cumulative search results, and initiate a display of a summary of the cumulative search results based on a relevance analysis of the accumulated results metadata.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIG. 4 is a flowchart illustrating example operations of the system of FIG. 1.

DETAILED DESCRIPTION

Users of search engines may submit large numbers of various queries relating to various tasks, in pursuit of relevant responses to questions that may arise in research of various topics. Users involved in a particular task (e.g., researching a paper) may wish to focus on the task, without significant distractions.

Example techniques discussed herein may provide a search scratch pad application that may run asynchronously, as a background application to another user application associated with a current user task. For example, as the user progresses in his/her task, the user may provide various search query objects to the search scratch pad application, while the user continues on in his/her task without the distraction of obtaining and reviewing search results for each individual search query object. When the user reaches a point in his/her task wherein he/she may wish to view query results, he/she may switch to a display of aggregated results of the accumulated search query objects to that point.

According to an example embodiment, the aggregation of the results may be session-based, for example, based on a session of research by the user. Thus, a relevance of displayed results may be based on the search query objects provided by the user to the search scratch pad application during a particular research session (e.g., composing an email message, editing a research paper).

For example, a "scratch pad" may be used for accumulating entities such as thoughts or tasks (e.g., for later processing) while a user is engaged in other activities (e.g., writing a research paper, talking to children/students/colleagues, watching a movie). For example, many people may use a scratch pad to generate lists of tasks to be performed over time, or to generate lists of things they wish to obtain (e.g., shopping lists that may include both items and places to visit). For example, a scratch pad may be used to accumulate a list of objects for travel (e.g., hotel accommodations, travel arrangements, rental car arrangements, meals on a trip, sightseeing destinations).

Such example techniques may thus provide improved relevance of the aggregated search results (over single search queries) and aid in user discovery of relationships among large numbers of queries.

Figure 1:
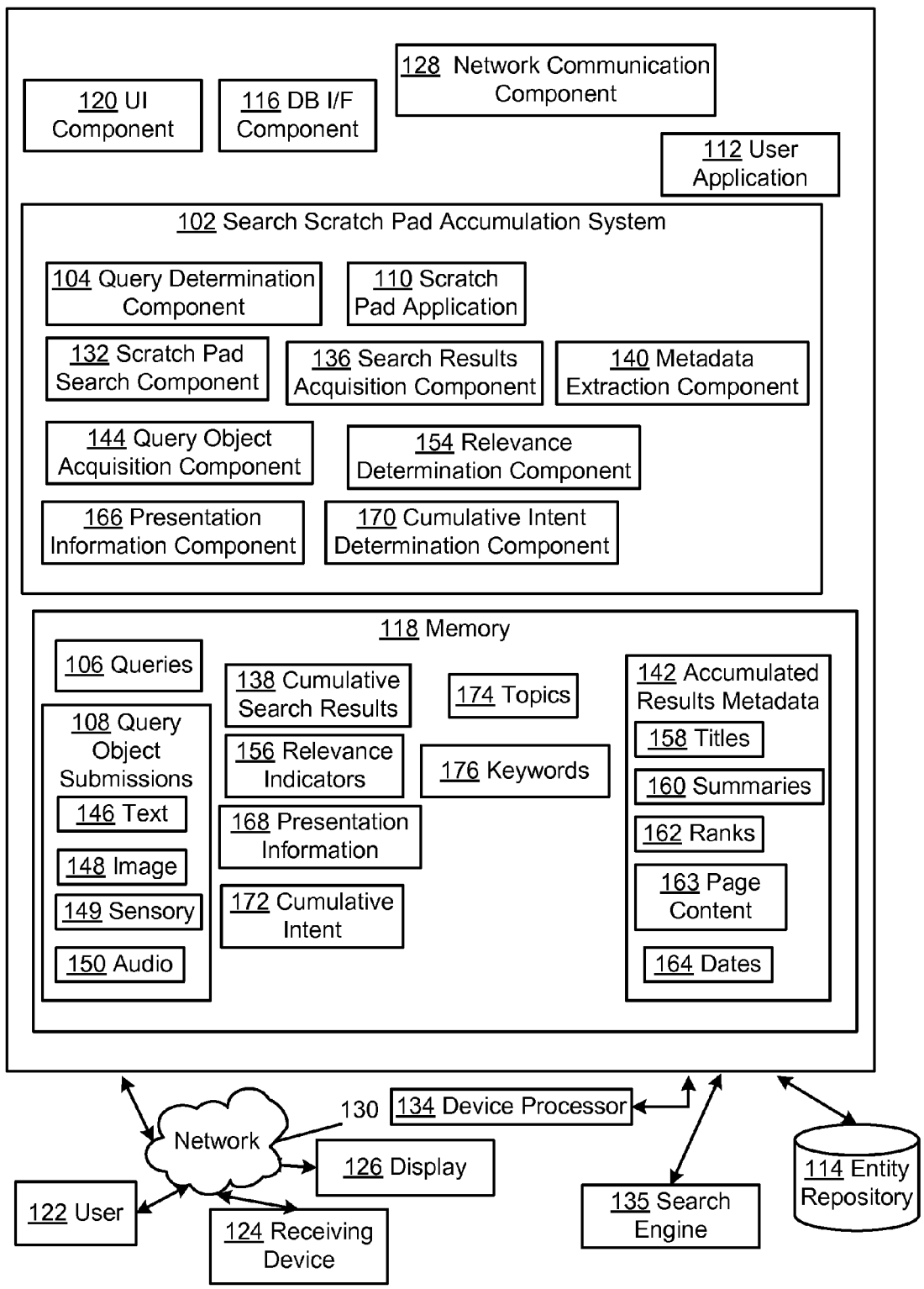
FIG. 1 is a block diagram of an example system for search scratch pad operations.

As further discussed herein, FIG. 1 is a block diagram of a system 100 for example search scratch pad operations. As shown in FIG. 1, a system 100 may include a search scratch pad accumulation system 102 that includes a query determination component 104 that may determine a plurality of queries 106 associated with a plurality of user query object submissions 108 to a scratch pad application 110 executing asynchronously as a background application to a first user application 112. For example, the query determination component 104 may obtain the plurality of queries 106 as text input from a user, or may determine queries based on analyses of the user query object submissions 108 (e.g., analyses of text, image, and/or audio data included in the user query object submissions 108).

According to an example embodiment, the search scratch pad accumulation system 102 may include executable instructions that may be stored on a computer-readable storage medium, as discussed below. According to an example embodiment, the computer-readable storage medium may include any number of storage devices, and any number of storage media types, including distributed devices.

For example, an entity repository 114 may include one or more databases, and may be accessed via a database interface component 116. One skilled in the art of data processing will appreciate that there are many techniques for storing repository information discussed herein, such as various types of database configurations (e.g., relational databases, hierarchical databases, distributed databases) and non-database configurations.

According to an example embodiment, the search scratch pad accumulation system 102 may include a memory 118 that may store the queries 106. In this context, a "memory" may include a single memory device or multiple memory devices configured to store data and/or instructions. Further, the memory 118 may span multiple distributed storage devices.

According to an example embodiment, a user interface component 120 may manage communications between a user 122 and the search scratch pad accumulation system 102. The user 122 may be associated with a receiving device 124 that may be associated with a display 126 and other input/output devices. For example, the display 126 may be configured to communicate with the receiving device 124, via internal device bus communications, or via at least one network connection.

According to an example embodiment, the search scratch pad accumulation system 102 may include a network communication component 128 that may manage network communication between the search scratch pad accumulation system 102 and other entities that may communicate with the search scratch pad accumulation system 102 via at least one network 130. For example, the at least one network 130 may include at least one of the Internet, at least one wireless network, or at least one wired network. For example, the at least one network 130 may include a cellular network, a radio network, or any type of network that may support transmission of data for the search scratch pad accumulation system 102. For example, the network communication component 128 may manage network communications between the search scratch pad accumulation system 102 and the receiving device 124. For example, the network communication component 128 may manage network communication between the user interface component 120 and the receiving device 124.

A scratch pad search component 132 may initiate, via a device processor 134, one or more search operations based on each one of the plurality of obtained queries 106, the scratch pad search component 132 executing asynchronously, in association with the background application, to the first user application 112. For example, the scratch pad search component 132 may initiate one or more search operations via one or more search engines 135. For example, one or more of the search engines 135 may be included in the system 100, or may be accessible via the network 130.

In this context, a "processor" may include a single processor or multiple processors configured to process instructions associated with a processing system. A processor may thus include multiple processors processing instructions in parallel and/or in a distributed manner. Although the device processor 134 is depicted as external to the search scratch pad accumulation system 102 in FIG. 1, one skilled in the art of data processing will appreciate that the device processor 134 may be implemented as a single component, and/or as distributed units which may be located internally or externally to the search scratch pad accumulation system 102, and/or any of its elements.

A search results acquisition component 136 may obtain cumulative search results 138 of the one or more search operations, the cumulative search results 138 accumulated over the plurality of obtained queries 106. For example, the cumulative search results 138 may be related to a task of the user 122 based on a session of user interaction with the first user application, and the cumulative search results 138 may be stored in session-based storage on the receiving device 124.

A metadata extraction component 140 may obtain a set of accumulated results metadata 142 based on an analysis of the accumulated cumulative search results 138. For example, the search results returned from the search engine 135 may include search result metadata. For example, the set of accumulated results metadata 142 may include processed portions of the search result metadata returned by the search engine 135, as discussed further herein.

According to an example embodiment, a user query object acquisition component 144 may receive the plurality of user query object submissions 108, each of the user query object submissions 108 including one or more of text query data 146, image data 148, sensory data 149, or audio data 150. For example, a user query object submission 108 may include an image of the Space Needle, which may be processed to determine a query term "Seattle" or "Space Needle".

According to an example embodiment, the user query object acquisition component 144 may receive the plurality of user query object submissions 108, each of the user query object submissions 108 received via one or more of text entry in a text area displayed to a user, a drag and drop of one of the user query object submissions 108, audio input, image input, sensory input, or a paste operation of one of the user query object submissions 108 based on a copy operation from the first user application 112 that is different from the scratch pad application 110.

According to an example embodiment, the user query object acquisition component 144 may receive the plurality of user query object submissions 108, the user query object acquisition component 144 receiving user activation via one or more of a task tray icon activation, a right click indication, a left click indication, an audio request, or a user touch received via a context menu. For example, a task tray icon may represent the scratch pad application, and may be activated via a user click or touch on the icon. For example, a display area may then be displayed for entry of a next user query object submission 108 (e.g., text data, image data, audio data). For example, the user 122 may provide a right click in an area of a current application in which the user is engaged, for which a display area may be provided at the point of the right click, for entry of the next user query object submission 108, after which the user may immediately return to the current application task, without waiting for a search operation to be completed, based on the user query object submission 108. For example, the scratch pad application 110 may initiate processing of the submitted user query object submission 108 asynchronously, in the background, while the user continues to be engaged in the current application (along with other user query object submissions 108 submitted, related to the current user task).

According to an example embodiment, a relevance determination component 154 may determine a plurality of relevance indicators 156 associated with portions of the search results associated with respective search operations associated with each one of the plurality of queries 106, the determination of the relevance indicators 156 based on the accumulated results metadata 142.

According to an example embodiment, the accumulated results metadata 142 may include one or more of a plurality of titles 158 of web pages, a plurality of text summaries 160 associated with web pages, a plurality of static ranks 162 associated with web pages, web page content 163 associated with individual search results, or a plurality of indicators of last search engine scan dates 164 associated with web pages. For example, the accumulated results metadata 142 may include metadata returned via search operations performed by one or more search engines 135.

According to an example embodiment, a presentation information component 166 may determine a set of presentation information 168 based on one or more relevance analysis operations associated with the set of accumulated results metadata 142. For example, the presentation information component 166 may determine the set of presentation information 168 based on determining the most relevant information included in the set of accumulated results metadata 142, based on statistical relevance analyses.

According to an example embodiment, the presentation information component 166 may determine the set of presentation information 168 based on clustering correlated portions of the search results 138, based on the one or more relevance analysis operations associated with the set of accumulated results metadata 142.

According to an example embodiment, a cumulative intent determination component 170 may determine an inferred cumulative user intent 172 associated with the plurality of user query object submissions 108, the determination of the inferred cumulative user intent 172 based on the accumulated results metadata 142. For example, if the user 122 provides user query object submissions 108 with a high frequency of occurrence of objects related to cats, then the inferred cumulative user intent 172 may indicate "cats" research, or "animals" research.

According to an example embodiment, the cumulative intent determination component 170 may determine the inferred cumulative user intent 172 based on determining a plurality of topics 174 and keywords 176, based on the accumulated results metadata 142. For example, a single query term "jaguar" may be considered ambiguous (e.g., car, animal, sports team). However, the a search query of "jaguar" processed with other queries relating to a same task may provide information to determine the user intent (e.g., a query "jaguar" included with other queries that include photos of cats, queries for "zoos" or "jungles" may provide an inferred cumulative user intent 172 of research on "animals").

According to an example embodiment, the plurality of user query object submissions 108 may be associated with user activity associated with user interaction with the first user application 112 that is different from the scratch pad application 110, the scratch pad application 110 executing asynchronously from the first user application 112, the scratch pad application 110 instructions executing in a background execution environment.

According to an example embodiment, the user activity may be associated with the cumulative user intent 172.

According to an example embodiment, the cumulative intent determination component 170 may determine the inferred cumulative user intent 172 associated with the plurality of user query object submissions 108 based on a term frequency-inverse document frequency (tf-idf) ranking analysis based on the cumulative search results 138 of the one or more search operations.

For example, a tf-idf weight may include a statistical measure indicating an importance or relevance of a word relating to a document in a collection or corpus. The importance may increase proportionally to the number of times the word appears in the document, but may be offset by the frequency of the word in the corpus. For example, a search engine may score and rank a document's relevance, given a user query. One skilled in the art of data processing will understand that tf-idf is one example of a keyword extraction algorithm that may be used; however, example techniques discussed herein may also be implemented using other extraction algorithms, or combinations of algorithms, without departing from the spirit of the discussion herein.

Figure 2A:
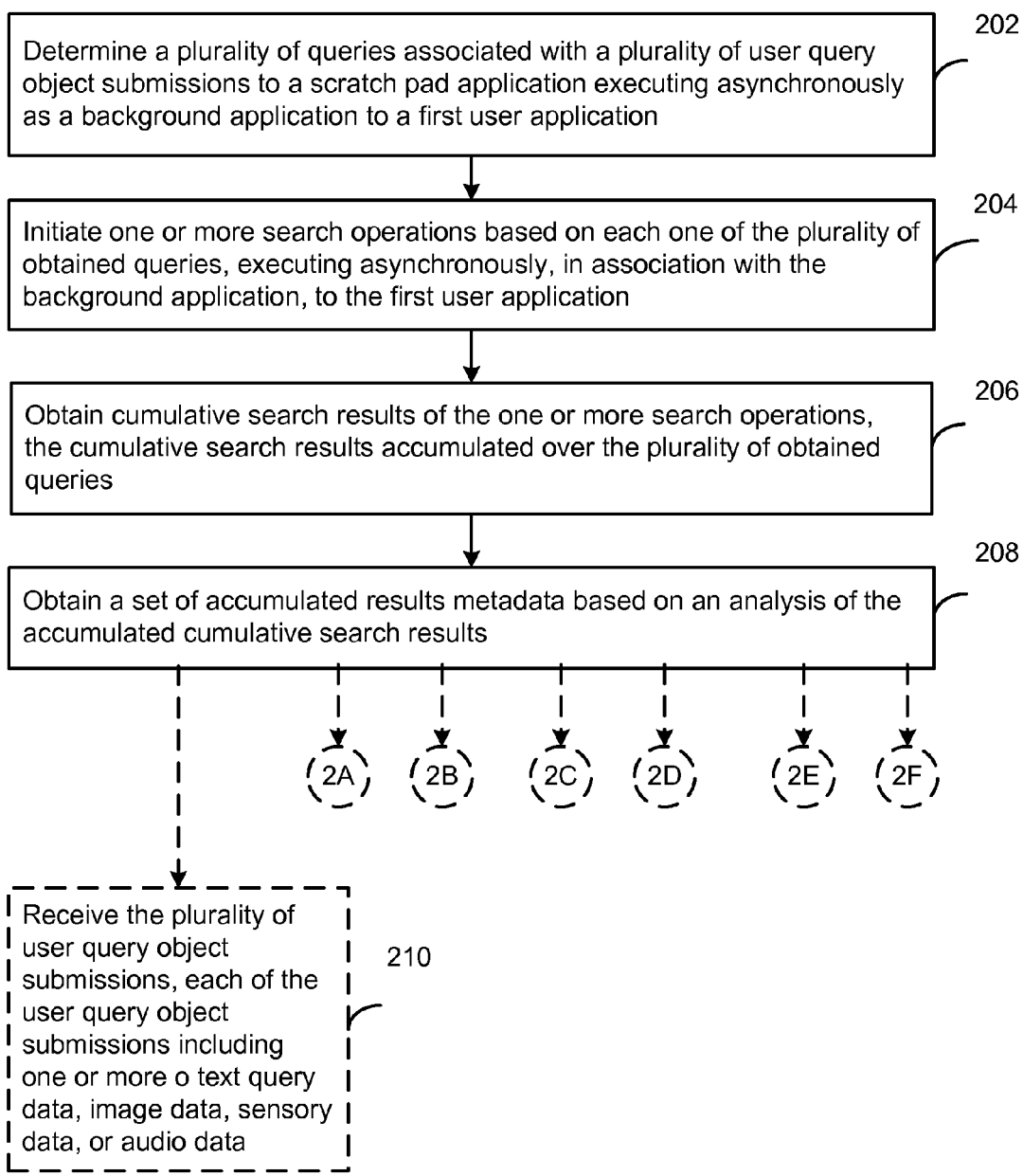
FIG. 2 is a flowchart illustrating example operations of the system of FIG. 1.
Figure 2C:
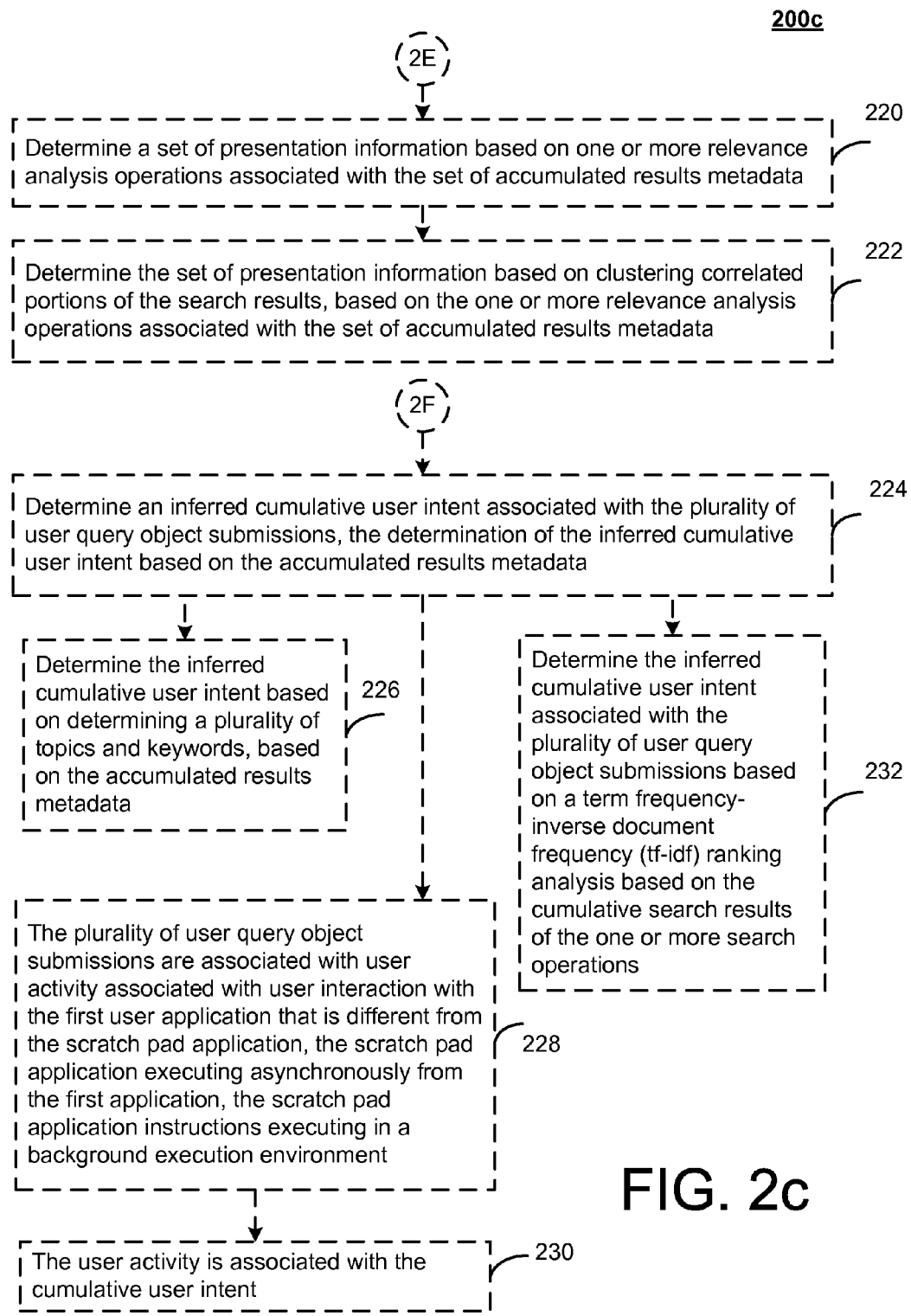

FIG. 2 is a flowchart illustrating example operations of the system of FIG. 1, according to example embodiments. In the example of FIG. 2a, a plurality of queries associated with a plurality of user query object submissions to a scratch pad application executing asynchronously as a background application to a first user application may be determined (202). For example, the query determination component 104 may determine a plurality of queries 106 associated with a plurality of user query object submissions 108 to a scratch pad application 110 executing asynchronously as a background application to a first user application 112, as discussed above.

One or more search operations may be initiated based on each one of the plurality of obtained queries, executing asynchronously, in association with the background application, to the first user application (204). For example, the scratch pad search component 132 may initiate, via the device processor 134, one or more search operations based on each one of the plurality of obtained queries 106, as discussed above.

Cumulative search results of the one or more search operations may be obtained, the cumulative search results accumulated over the plurality of obtained queries (206). For example, the search results acquisition component 136 may obtain cumulative search results 138 of the one or more search operations, the cumulative search results 138 accumulated over the plurality of obtained queries 106, as discussed above.

A set of accumulated results metadata may be obtained based on an analysis of the accumulated cumulative search results (208). For example, the metadata extraction component 140 may obtain a set of accumulated results metadata 142 based on an analysis of the accumulated cumulative search results 138, as discussed above.

According to an example embodiment, the plurality of user query object submissions may be received, each of the user query object submissions including one or more of text query data, image data, sensory data, or audio data (210). For example, the user query object acquisition component component 144 may receive the plurality of user query object submissions 108, each of the user query object submissions 108 including one or more of text query data 146, image data 148, sensory data 149, or audio data 150, as discussed above.

According to an example embodiment, the plurality of user query object submissions may be received via one or more of text entry in a text area displayed to a user, a drag and drop of one of the user query object submissions, audio input, image input, sensory input, or a paste operation of one of the user query object submissions based on a copy operation from the first user application that is different from the scratch pad application (212). For example, the user query object acquisition component 144 may receive the plurality of user query object submissions 108, each of the user query object submissions 108 received via one or more of text entry in a text area displayed to a user, a drag and drop of one of the user query object submissions 108, audio input, image input, sensory input, or a paste operation of one of the user query object submissions 108 based on a copy operation from the first user application 112 that is different from the scratch pad application 110, as discussed above.

According to an example embodiment, the plurality of user query object submissions may be received based on user activation via one or more of a task tray icon activation, a right click indication, a left click indication, an audio request, or a user touch received via a context menu (214). For example, the user query object acquisition component 144 may receive the plurality of user query object submissions 108, the user query object acquisition component 144 receiving user activation via one or more of a task tray icon activation, a right click indication, a left click indication, an audio request, or a user touch received via a context menu, as discussed above.

According to an example embodiment, a plurality of relevance indicators associated with portions of the search results associated with respective search operations associated with each one of the plurality of queries may be determined, the determination of the relevance indicators based on the accumulated results metadata (216). For example, the relevance determination component component 154 may determine a plurality of relevance indicators 156 associated with portions of the search results associated with respective search operations associated with each one of the plurality of queries 106, the determination of the relevance indicators 156 based on the accumulated results metadata 142, as discussed above.

According to an example embodiment, the accumulated results metadata may include one or more of a plurality of titles of web pages, a plurality of text summaries associated with web pages, a plurality of static ranks associated with web pages, web page content associated with individual search results, or a plurality of indicators of last search engine scan dates associated with web pages (218). For example, the accumulated results metadata 142 may include one or more of the plurality of titles 158 of web pages, the plurality of text summaries 160 associated with web pages, the plurality of static ranks 162 associated with web pages, web page content 163 associated with individual search results, or the plurality of indicators of last search engine scan dates 164 associated with web pages.

According to an example embodiment, a set of presentation information may be determined based on one or more relevance analysis operations associated with the set of accumulated results metadata (220). For example, the presentation information component 166 may determine a set of presentation information 168 based on one or more relevance analysis operations associated with the set of accumulated results metadata 142, as discussed above.

According to an example embodiment, the set of presentation information may be determined based on clustering correlated portions of the search results, based on the one or more relevance analysis operations associated with the set of accumulated results metadata (222). For example, the presentation information component 166 may determine the set of presentation information 168 based on clustering correlated portions of the search results 138, based on the one or more relevance analysis operations associated with the set of accumulated results metadata 142, as discussed above.

According to an example embodiment, an inferred cumulative user intent associated with the plurality of user query object submissions may be determined, based on the accumulated results metadata (224). For example, the cumulative intent determination component 170 may determine the inferred cumulative user intent 172 associated with the plurality of user query object submissions 108, the determination of the inferred cumulative user intent 172 based on the accumulated results metadata 142, as discussed above.

According to an example embodiment, the inferred cumulative user intent may be determined based on determining a plurality of topics and keywords, based on the accumulated results metadata (226). For example, the cumulative intent determination component 170 may determine the inferred cumulative user intent 172 based on determining a plurality of topics 174 and keywords 176, based on the accumulated results metadata 142, as discussed above.

According to an example embodiment, the plurality of user query object submissions may be associated with user activity associated with user interaction with the first user application that is different from the scratch pad application, the scratch pad application executing asynchronously from the first user application, the scratch pad application instructions executing in a background execution environment (228).

According to an example embodiment, the user activity may be associated with the cumulative user intent (230).

According to an example embodiment, the inferred cumulative user intent associated with the plurality of user query object submissions may be determined based on a term frequency-inverse document frequency (tf-idf) ranking analysis based on the cumulative search results of the one or more search operations (232). For example, the cumulative intent determination component 170 may determine the inferred cumulative user intent 172 associated with the plurality of user query object submissions 108 based on a tf-idf ranking analysis based on the cumulative search results 138 of the one or more search operations, as discussed above.

Figure 3A:
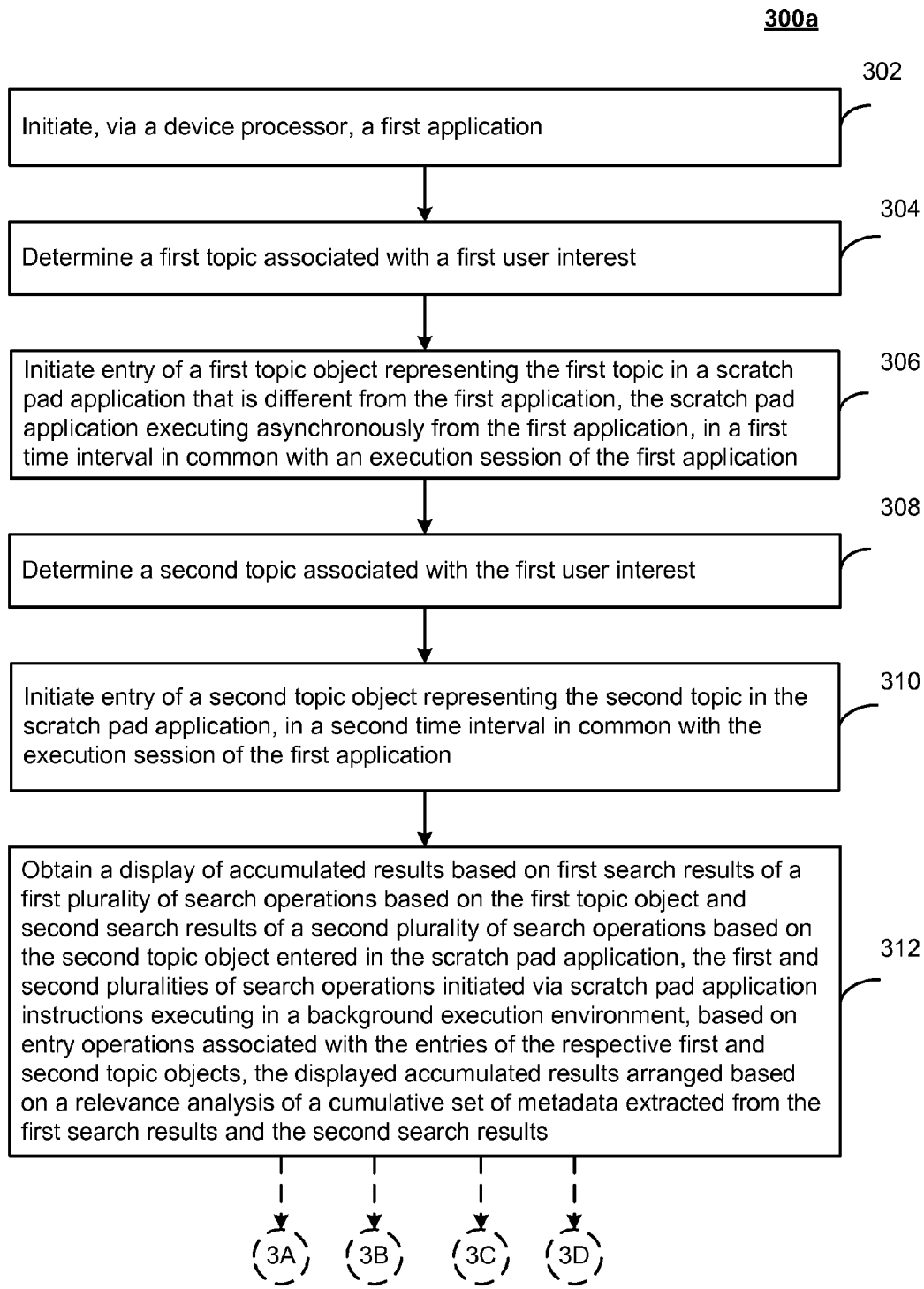
FIG. 3 is a flowchart illustrating example operations of the system of FIG. 1.
Figure 3C:
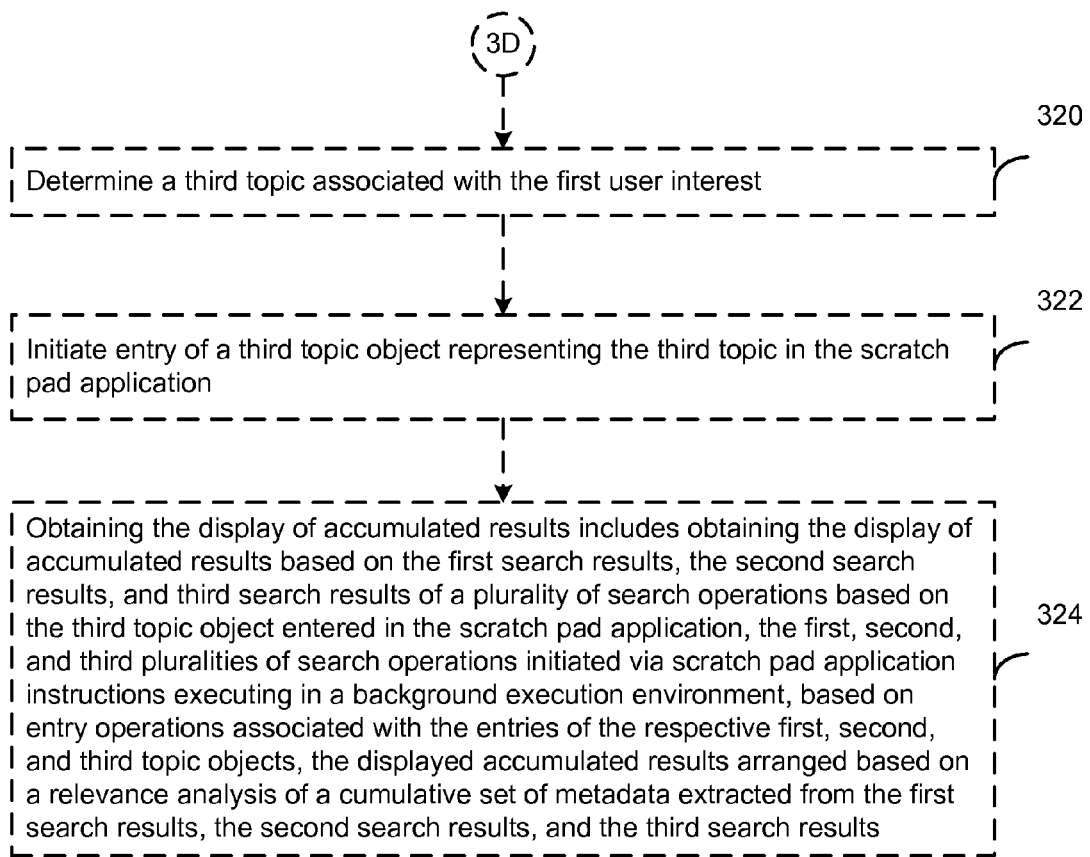

FIG. 3 is a flowchart illustrating example operations of the system of FIG. 1, according to example embodiments. In the example of FIG. 3a, a first application may be initiated (302). For example, the operations of FIG. 3 may be performed with regard to a user device such as the receiving device 124. For example, the user device may include one or more mobile devices, one or more desktop devices, or one or more server devices. For example, the first user application 112 may be initiated, as discussed above.

A first topic associated with a first user interest may be determined (304). For example, a first topic "flights to New York City" may be determined, related to a first user interest of "trip to New York City".

Entry of a first topic object representing the first topic in a scratch pad application that is different from the first application may be initiated, the scratch pad application executing asynchronously from the first application, in a first time interval in common with an execution session of the first application (306). For example, a first one of the plurality of user query object submissions 108 may be entered into the scratch pad application 110 executing asynchronously as a background application to the first user application 112, as discussed above. For example a text query "flights Seattle to New York City" may be entered into the scratch pad application 110.

A second topic associated with the first user interest may be determined (308). For example, a second topic "hotels in New York City" may be determined, related to the first user interest of "trip to New York City".

Entry of a second topic object representing the second topic in the scratch pad application may be initiated, in a second time interval in common with the execution session of the first application (310). For example, a second one of the plurality of user query object submissions 108 may be entered into the scratch pad application 110 executing asynchronously as a background application to the first user application 112, as discussed above. For example a text query "hotels in New York City" may be entered into the scratch pad application 110.

A display of accumulated results may be obtained based on first search results of a first plurality of search operations based on the first topic object and second search results of a second plurality of search operations based on the second topic object entered in the scratch pad application, the first and second pluralities of search operations initiated via scratch pad application instructions executing in a background execution environment, based on entry operations associated with the entries of the respective first and second topic objects, the displayed accumulated results arranged based on a relevance analysis of a cumulative set of metadata extracted from the first search results and the second search results (312). For example, the presentation information component 166 may determine the set of presentation information 168, as discussed above, and a display of the accumulated results may be initiated via the display 126.

According to an example embodiment, initiating entry of the first topic object representing the first topic in the scratch pad application may include one or more of initiating text entry in a text area displayed to a user, a dragging and dropping of the first topic object from the first application to the scratch pad application, initiating audio input, initiating image input, initiating sensory input, or a paste operation of the first topic object based on a copy operation from the first application to the scratch pad application (314). For example, one or more of the user query object submissions 108 may be provided to the scratch pad application 110. For example, the one or more of the user query object submissions 108 may be provided to the scratch pad application 110 as the user 122 continues with one or more tasks associated with the first user application 112.

According to an example embodiment, the displayed accumulated results may include one or more of a Uniform Resource Locator (URL), a topic associated with a query result, a text summary, an image, audio data, an audio file selectable icon, or an image file selectable icon (316). For example, the displayed accumulated results may include results of search operations performed by the one or more search engines 135. For example, the displayed accumulated results may include aggregated or condensed results of search operations performed by the one or more search engines 135, based on analyses of the accumulated results metadata 142.

According to an example embodiment, access to a search topic object entry display area associated with the scratch pad application may be requested via one or more of a task tray icon activation, a right click indication in a display area associated with the first application, a left click indication in a display area associated with the first application, an audio request, or a user touch received via a context menu (318).

According to an example embodiment, a third topic associated with the first user interest may be determined (320). For example, a third topic "restaurants in New York City" may be determined, related to the first user interest of "trip to New York City".

According to an example embodiment, entry of a third topic object representing the third topic in the scratch pad application may be initiated (322). For example a text query "restaurants in New York City" may be entered into the scratch pad application 110.

According to an example embodiment, obtaining the display of accumulated results may include obtaining the display of accumulated results based on the first search results, the second search results, and third search results of a plurality of search operations based on the third topic object entered in the scratch pad application, the first, second, and third pluralities of search operations initiated via scratch pad application instructions executing in a background execution environment, based on entry operations associated with the entries of the respective first, second, and third topic objects, the displayed accumulated results arranged based on a relevance analysis of a cumulative set of metadata extracted from the first search results, the second search results, and the third search results (324).

FIG. 4 is a flowchart illustrating example operations of the system of FIG. 1, according to example embodiments. In the example of FIG. 4, a plurality of queries associated with a plurality of user query object submissions to a scratch pad application executing asynchronously as a background application to a first user application may be obtained (402). For example, the query determination component 104 may determine the plurality of queries 106 associated with the plurality of user query object submissions 108 to the scratch pad application 110 executing asynchronously as a background application to the first user application 112, as discussed above.

One or more search requests to one or more search engines may be initiated based on each one of the plurality of obtained queries (404). For example, the scratch pad search component 132 may initiate, via the device processor 134, one or more search operations based on each one of the plurality of obtained queries 106, as discussed above.

Cumulative search results of the one or more search requests may be obtained, the cumulative search results accumulated over the plurality of obtained queries (406). For example, the search results acquisition component 136 may obtain cumulative search results 138 of the one or more search operations, the cumulative search results 138 accumulated over the plurality of obtained queries 106, as discussed above.

A set of accumulated results metadata may be obtained based on an analysis of the accumulated cumulative search results (408). For example, the metadata extraction component 140 may obtain a set of accumulated results metadata 142 based on an analysis of the accumulated cumulative search results 138, as discussed above.

A display of a summary of the cumulative search results based on a relevance analysis of the accumulated results metadata may be initiated (410). For example, the summary of the cumulative search results 138 may be initiated via the display 126, as discussed above.

According to an example embodiment, the plurality of user query object submissions may include one or more of text query data, image data, sensory data, or audio data (412). For example, the user query object acquisition component component 144 may receive the plurality of user query object submissions 108, each of the user query object submissions 108 including one or more of text query data 146, image data 148, sensory data, or audio data 150, as discussed above.

According to an example embodiment, the display of the summary of the cumulative search results may be initiated based on determining a set of presentation information based on one or more relevance analysis operations associated with the set of accumulated results metadata, based on a term frequency-inverse document frequency (tf-idf) ranking analysis based on the cumulative search results of the one or more search requests (414). For example, the cumulative intent determination component 170 may determine the inferred cumulative user intent 172 associated with the plurality of user query object submissions 108 based on a tf-idf ranking analysis based on the cumulative search results 138 of the one or more search operations, as discussed above. For example, the presentation information component 166 may determine a set of presentation information 168 based on one or more relevance analysis operations associated with the set of accumulated results metadata 142, as discussed above.

Figure 5:
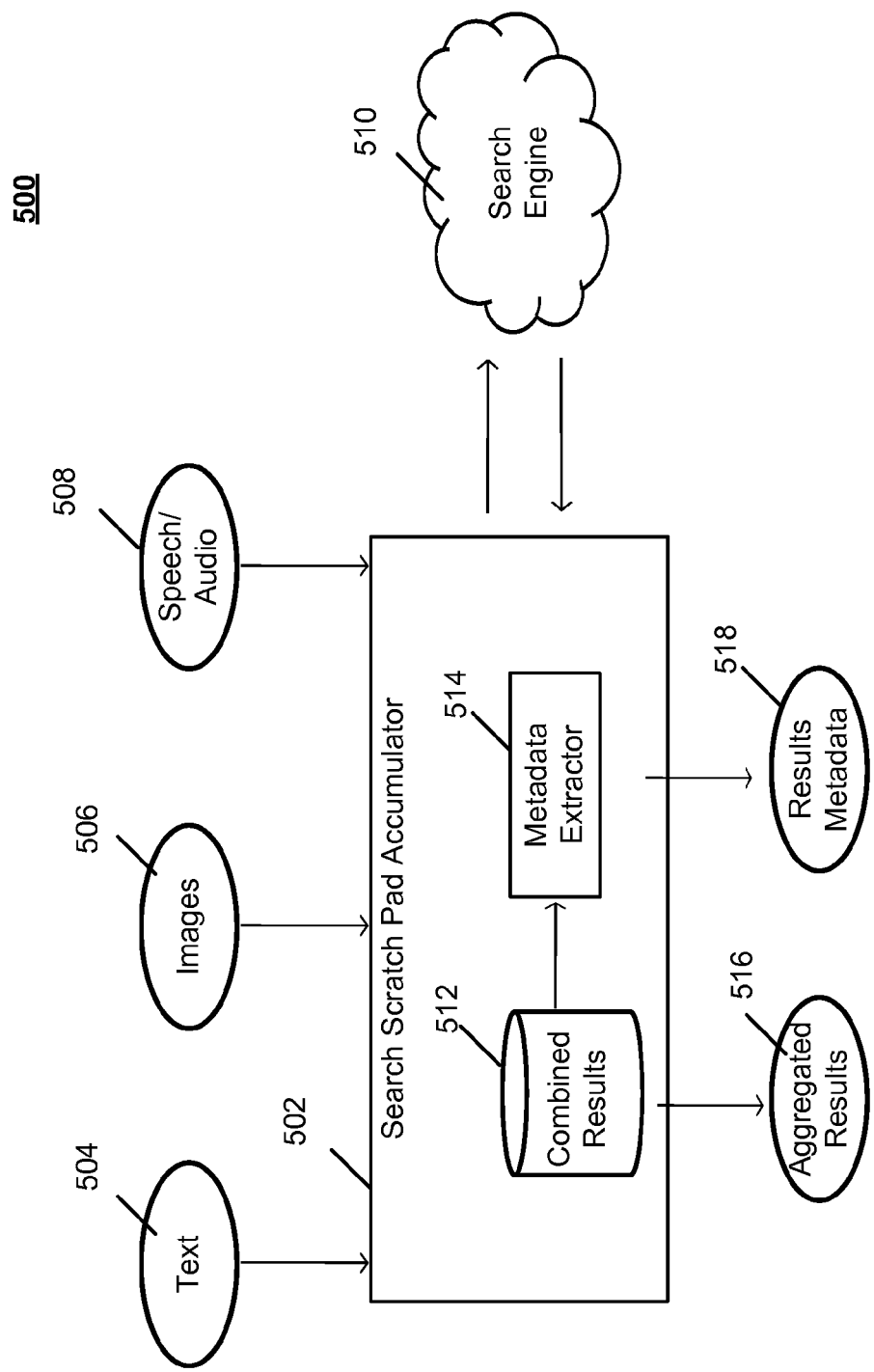
FIG. 5 is a block diagram of an example system for search scratch pad operations.

FIG. 5 is a block diagram of an example system for search scratch pad operations, according to an example embodiment. As shown in FIG. 5, a search scratch pad accumulator 502 may receive input text 504, images 506, and/or speech/audio data 508. For example, the search scratch pad accumulation system 102 may receive the user query object submissions 108. For example, the user query object acquisition component 144 may receive the plurality of user query object submissions 108, each of the user query object submissions 108 including one or more of text query data 146, image data 148, sensory data 149, or audio data 150, as discussed above.

According to an example embodiment, the search scratch pad accumulator 502 may include (or may communicate with) a combined results 512 database and a metadata extractor 514. For example, the combined results 512 database may include the cumulative search results 138, as discussed above. For example, the metadata extractor 514 may include the metadata extraction component 140, as discussed above.

As shown in FIG. 5, the search scratch pad accumulator 502 may provide queries to a search engine 510, and obtain results of search operations. For example, the query determination component 104 may determine a plurality of queries 106 associated with a plurality of user query object submissions 108 to the scratch pad application 110 executing asynchronously as a background application to the first user application 112. For example, the search results acquisition component 136 may obtain cumulative search results 138 of the one or more search operations, the cumulative search results 138 accumulated over the plurality of obtained queries 106, as discussed above.

As shown in FIG. 5, the search scratch pad accumulator 502 may provide aggregated results 516 (e.g., the presentation information 168) and results metadata 518 (e.g., the accumulated results metadata 142), as discussed above.

FIG. 5 depicts the search scratch pad accumulator 502 as external to the search engine 510; however, one skilled in the art of data processing will understand that the search scratch pad accumulator 502 may also be implemented as a service internal to the search engine 510, in accordance with example embodiments.

Figure 6:
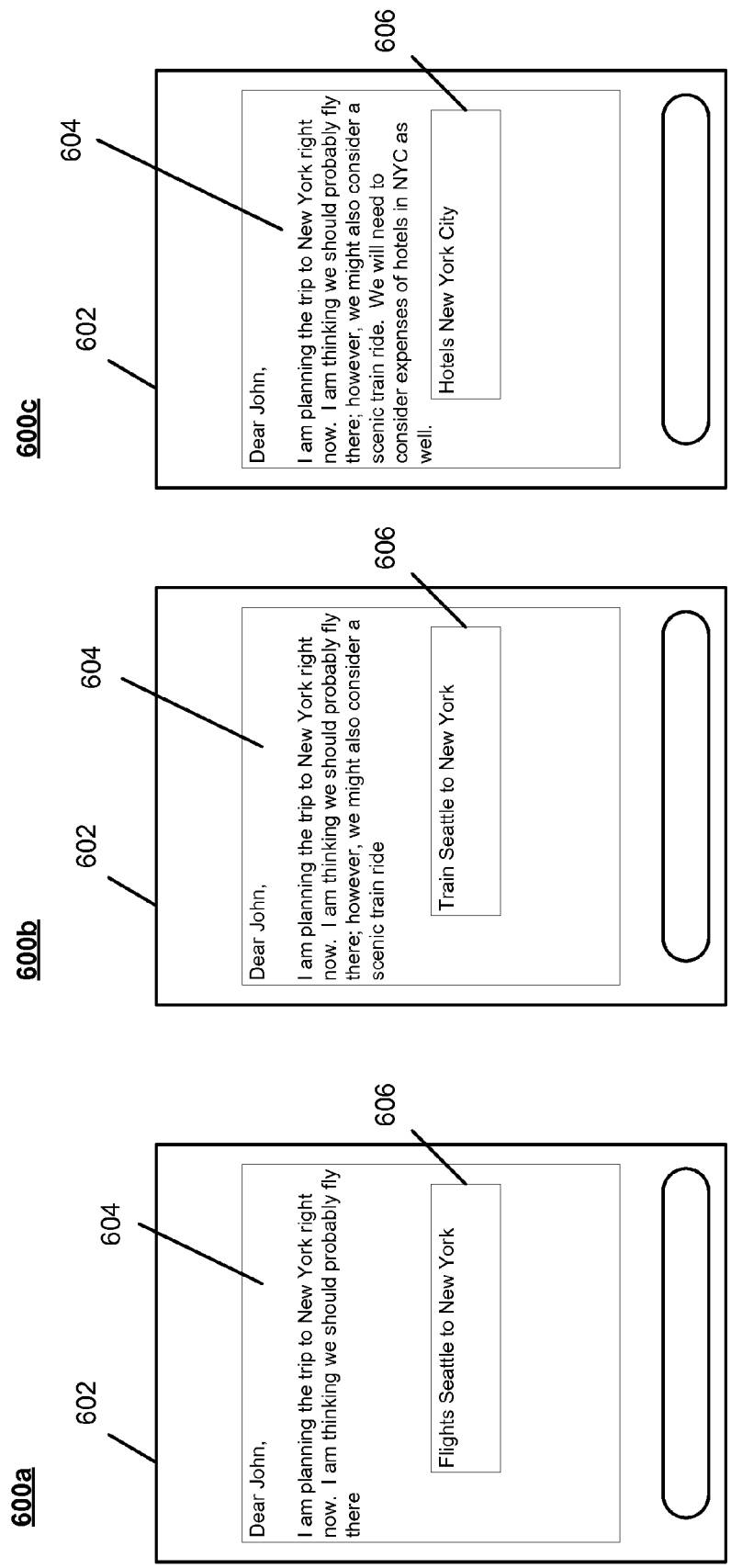
FIG. 6 depicts an example user interface for user input to the system of FIG. 1.

FIG. 6 depicts an example user interface for user input to the system of FIG. 1. As shown in FIG. 6, a user (e.g., the user 122) of a device 602 may be planning a trip, for example, to New York City. The user 122 may compose a message 604 (e.g., in an email application or a word processing application executing asynchronously to the scratch pad application 110) to a friend who may wish to accompany the user 122 on the trip. As the user 122 composes the message 604, he/she may wish to request information associated with the trip via search queries.

As discussed above, the user 122 may provide search queries (or objects) to the scratch pad application 110 that may be executing asynchronously to the email or word processing application. Thus, the user 122 may indicate a desire to provide queries, for example, via activation of an icon in a task tray, or via a right click. In response to the activation, a display area 606 may appear for entry of the search queries. As shown in FIG. 6*a*, the user 122 may enter a query in the display area 606 with regard to flights from Seattle to New York City. The user 122 may then continue with composition of his/her message (i.e., without breaking away to formally submit a search query to a search engine). For example, the user 122 may enter queries in the display area 606 that are related to the user task of planning the trip from Seattle to New York City (e.g., queries grouped by the user 122 based on the trip planning task).

For example, the user 122 may indicate "Seattle" by dragging an image of the Space Needle into the display area 606. For example, the user 122 may indicate "New York City" by dragging an audio file of a song associated with New York City (or a picture of the Empire State Building) into the display area 606. For example, the user 122 may indicate "New York City" by dropping a Uniform Resource Locator (URL) associated with a web page discussing New York City into the display area 606.

As shown in FIG. 6*b*, the user 122 may enter a query in the display area 606 with regard to trains from Seattle to New York City, as the composed message 604 now includes thoughts regarding different ways to travel to New York City. As shown in FIG. 6*c*, the user 122 may provide another search query to the activated display area 606 requesting information regarding New York City Hotels, as he/she continues in the message 604 with regard to expenses relating to lodging during his/her trip.

Figure 7:
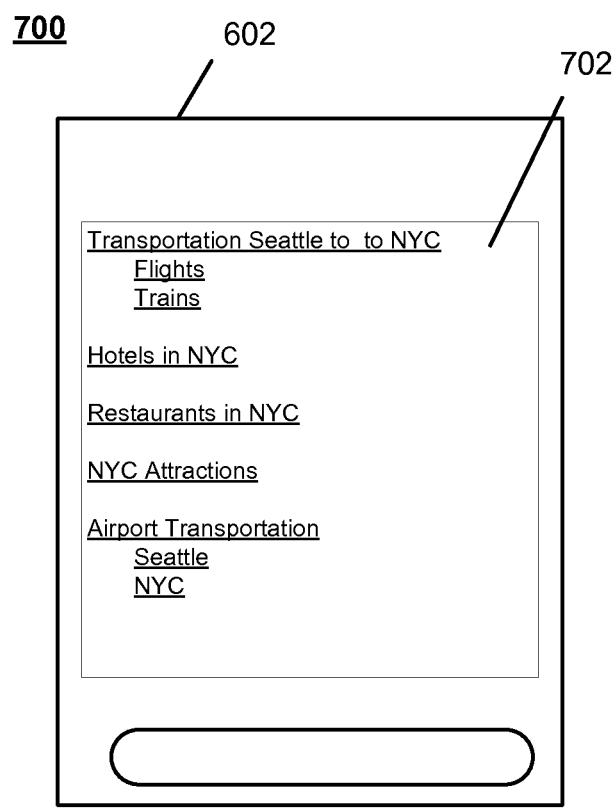
FIG. 7 depicts an example user interface for displaying search scratch pad results to a user.

FIG. 7 depicts an example user interface 700 for displaying search scratch pad results to a user. As shown in FIG. 7, a display 702 of results accumulated over the search queries may be presented to the user 122. For example, the display

702 may be organized based on topics (e.g., the topics 174) and/or keywords (e.g., the keywords 176), based on analyses of the accumulated results metadata 142, as discussed above. For example, the search scratch pad accumulation system 102 may have determined a cumulative user intent 172 with regard to a tip to New York City (e.g., from Seattle), based on the queries submitted to the scratch pad application 110. For example, the accumulated results metadata 142 may be grouped based on mode of travel, lodging in New York City, and additional considerations that may be considered of high relevance for users travelling to New York City (e.g., restaurants, New York City attractions such a Broadway shows and museums, and airport transportation). As shown in FIG. 7, the user 122 may activate links to drill down to more specific information with regard to the displayed topics.

Although not shown in FIG. 7, the display 702 may also include image data and audio data related to the cumulative results.

One skilled in the art of data processing will appreciate that there are many ways of presenting and displaying the aggregated, cumulative results of the search queries based on the queries 106. For example, MICROSOFT PIVOT may be utilized in processing accumulated presentation information 168 for display to the user 122.

According to an example embodiment, the display 702 may further include features which may indicate relationships among results for different queries (e.g., results that match more than one input query, overlapping topics, themes, suggestions of probable task-based features).

Example techniques discussed herein allow the user to submit more than one query input relating to a user task. As discussed above, the query input may include, for example, manually typed text, content dragged or cut and pasted from another application, or any of many other input formats.

According to an example embodiment, with each additional input, the user may view the current available results, or may ignore the current state and continue with some other task, for example, in a different application. Thus, an example input model associated with the search scratch pad accumulation system 102 may be asynchronous to the user. According to an example embodiment, results for an additional query may be fetched while the user continues to interact with other applications. Further, results for previous queries may be improved with the additional context of the new query input, according to an example embodiment. New search results may be obtained, and previously obtained (accumulated) results may be re-ordered.

Thus, when the user begins to interact with the results, there are more results which may be correlated among the different query inputs, providing additional metadata. Starting with a single input to result set mapping (i.e., a simple correlation), the example techniques discussed herein may obtain many inputs and result sets simultaneously, and may provide a system of filtering and sorting that may expose additional relationships among results and aid the user in obtaining his/her desired result, as well as potentially providing results that may be otherwise interesting to the user.

Example techniques discussed herein may provide a lower user-perceived latency, as the user will not experience wait times if at least one query input has been processed before the user first interacts with the results. According to an example embodiment, additional results may appear as they arrive, without wait time for the user but the user wanting to interact with results.

Example techniques discussed herein may provide better query interpretation over single search queries, as ambiguous queries may be resolved by additional input of multiple queries simultaneously. Additionally, intent may be derived, for example, based on a determination of whether the user wishes to travel to London and desires flight and hotel information, or whether the user is interested in researching Roman garrison settlements.

Example techniques discussed herein may provide improved relevance of search results over single search queries, based on improvements in query interpretation, based on simultaneous multiple queries related to a task.

As discussed above, many searches may be involved in tasks such as student research of a topic for a paper, or a user investigation of travel and sightseeing opportunities for a vacation. Both of these scenarios may involve many searches for different types of content or data, but may also be interrelated. Additionally, both of these tasks may lead to more immersive investigation where an initial query may provide ideas to the user for subsequent queries. Example techniques discussed herein may allow the user to accumulate the results from these queries. Then, by extracting metadata and common topics from the multiple result sets, example techniques discussed herein may provide the user an informative interaction with the results, enabling the discovery of new information, patterns in the results, or inspirations relating to further, new queries.

Example techniques discussed herein may thus provide aggregated search results based on an accumulation of search queries that may be based on user query object submissions to a scratch pad application 110 that may execute asynchronously to one or more other user applications to process the queries, while the user 122 continues working asynchronously in the other applications.

Customer privacy and confidentiality have been ongoing considerations in online environments for many years. Thus, example techniques for determining aggregated search results may use data that may be stored on a device of the user, and may thus avoid public storage of data that may be personal to particular users.

Implementations of the various techniques described herein may be implemented in digital electronic circuitry, or in computer hardware, firmware, software, or in combinations of them. Implementations may implemented in a propagated signal, or, alternatively, as a computer program product, i.e., a computer program tangibly embodied in an information carrier, e.g., in a machine usable or machine readable storage device (e.g., a magnetic or digital medium such as a Universal Serial Bus (USB) storage device, a tape, hard disk drive, compact disk, digital video disk (DVD), etc.) for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand alone program or as a module, component, subroutine, or other unit suitable for use in a computing environment. A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
one or more device processors;
a scratch pad application that receives an explicit indication from a user of a user intent to provide at least one explicit user query, during use by the user of a first user application, the scratch pad application responding to the explicit indication from the user by dynamically initiating a display, after, and in response to, receipt of the explicit indication, of a separate input receiving display area that receives and displays only at least one user query object submission representing the at least one explicit user query provided by the user, during continuing use by the user of the first user application in a session of research, the separate input receiving display area being visually provided at a display point of invocation, dynamically selected by the user, of the explicit indication, wherein the separate input receiving display area is configured to receive the user query object submission via a drag operation;
a query determination component that determines a plurality of queries associated with a plurality of user query object submissions accumulated by the user to the scratch pad application executing asynchronously as a background application to the first user application;
a scratch pad search component that initiates, via at least one of the one or more device processors, one or more search operations based on each one of the plurality of obtained queries, the scratch pad search component executing asynchronously, in association with the background application, to the first user application;
a search results acquisition component that obtains cumulative search results of the one or more search operations, the cumulative search results accumulated over the plurality of obtained queries for the session of research;
a metadata extraction component that obtains a set of accumulated results metadata based on an analysis of the accumulated cumulative search results, the set of accumulated results including a session-based group of accumulated results for the session of research; and
a cumulative intent determination component that determines an inferred cumulative user intent based on the accumulated results metadata, the inferred cumulative user intent including an inferred cumulative user intent based on the session-based group of accumulated results for the session of research.

2. The system of claim 1, further comprising:
a user query object acquisition component that receives the plurality of user query object submissions, each of the user query object submissions including one or more of:
text query data,
image data,
sensory data, or
audio data.

3. The system of claim 1, further comprising:
a user query object acquisition component that receives the plurality of user query object submissions, each of the user query object submissions received via one or more of:
text entry in a text area displayed to the user,
a drag and drop of one of the user query object submissions,
audio input,
image input,
sensory input, or
a paste operation of one of the user query object submissions based on a copy operation from the first user application that is different from the scratch pad application.

4. The system of claim 1, further comprising:
a user query object acquisition component that receives the plurality of user query object submissions, the user query object acquisition component receiving user activation via one or more of:
a task tray icon activation,
a right click indication,
a left click indication,
an audio request, or
a user touch received via a context menu.

5. The system of claim 1, further comprising:
a relevance determination component that determines a plurality of relevance indicators associated with portions of the search results associated with respective search operations associated with each one of the plurality of queries, the determination of the relevance indicators based on the accumulated results metadata.

6. The system of claim 1, wherein:
the accumulated results metadata includes one or more of:
a plurality of titles of web pages,
a plurality of text summaries associated with web pages,
a plurality of static ranks associated with web pages,
web page content associated with individual search results, or
a plurality of indicators of last search engine scan dates associated with web pages.

7. The system of claim 1, further comprising:
a presentation information component that determines a set of presentation information based on one or more relevance analysis operations associated with the set of accumulated results metadata.

8. The system of claim 7, wherein:
the presentation information component determines the set of presentation information based on clustering correlated portions of the search results, based on the one or more relevance analysis operations associated with the set of accumulated results metadata.

9. The system of claim 1, wherein:
the cumulative intent determination component determines the inferred cumulative user intent associated with the plurality of user query object submissions, the determination of the inferred cumulative user intent based on the accumulated results metadata.

10. The system of claim 9, wherein:
the cumulative intent determination component determines the inferred cumulative user intent based on determining a plurality of topics and keywords, based on the accumulated results metadata.

11. The system of claim 9, wherein:
the plurality of user query object submissions are associated with user activity associated with user interaction with the first user application that is different from the scratch pad application, the scratch pad application executing asynchronously from the first user application, the scratch pad application instructions executing in a background execution environment, wherein:
the user activity is associated with the cumulative user intent.

12. The system of claim 9, wherein:
the cumulative intent determination component determines the inferred cumulative user intent associated with the plurality of user query object submissions based on a term frequency-inverse document frequency (tf-idf) ranking analysis based on the cumulative search results of the one or more search operations.

13. A method comprising:
initiating, via a device processor, a first user application;
determining a first topic associated with an interest of a user;
explicitly indicating a user intent to provide at least one explicit user query, during use by the user of the first user application, after initiation of the first user application by the initiating;
receiving a response to the explicitly indicating that includes a separate input receiving display area that receives and displays only at least one user query object submission representing the at least one explicit user query provided by the user, during continuing use by the user of the first user application in a session of research;
initiating entry of a first topic object representing the first topic in a scratch pad application that is different from the first application, the scratch pad application executing asynchronously from the first application, in a first time interval in common with an execution session of the first application, the scratch pad application responding to the explicitly indicating by dynamically initiating a display, after, and in response to, receipt of the explicit indication, of the separate input receiving display area that receives and displays only the entered first topic object provided by the user, during continuing use by the user of the first user application, the separate input receiving display area being visually provided at a display point of invocation, dynamically selected by the user, of the explicit indication, wherein the separate input receiving display area receives the user query object submission via a drag operation;
determining a second topic associated with the interest of the user;
initiating entry of a second topic object representing the second topic, accumulatively by the user, in the scratch pad application, in a second time interval in common with the execution session of the first application in the session of research; and
obtaining a display of accumulated results based on first search results of a first plurality of search operations based on the first topic object and second search results of a second plurality of search operations based on the second topic object entered in the scratch pad application in the session of research, the first and second pluralities of search operations initiated via scratch pad application instructions executing in a background execution environment, based on entry operations associated with the entries of the respective first and second topic objects, the displayed accumulated results arranged based on a relevance analysis of a cumulative set of metadata extracted from the first search results and the second search results, and on an inferred cumulative user intent that is determined using the extracted cumulative set of metadata extracted from the first search results and the second search results, that are session-based, for the session of research.

14. The method of claim 13, wherein:
initiating entry of the first topic object representing the first topic in the scratch pad application includes one or more of:
initiating text entry in a text area displayed to the user,
a dragging and dropping of the first topic object from the first application to the scratch pad application,
initiating audio input,
initiating image input,
initiating sensory input, or
a paste operation of the first topic object based on a copy operation from the first application to the scratch pad application.

15. The method of claim 13, wherein:
the displayed accumulated results include one or more of:
- a Uniform Resource Locator (URL),
- a topic associated with a query result,
- a text summary,
- an image,
- audio data,
- an audio file selectable icon, or
- an image file selectable icon.

16. The method of claim 13, further comprising:
requesting access to a search topic object entry display area associated with the scratch pad application via one or more of:
- a task tray icon activation,
- a right click indication in a display area associated with the first application,
- a left click indication in a display area associated with the first application,
- an audio request, or
- a user touch received via a context menu.

17. The method of claim 13, further comprising:
determining a third topic associated with the first user interest; and
initiating entry of a third topic object representing the third topic in the scratch pad application, wherein
obtaining the display of accumulated results includes obtaining the display of accumulated results based on the first search results, the second search results, and third search results of a plurality of search operations based on the third topic object entered in the scratch pad application, the first, second, and third pluralities of search operations initiated via scratch pad application instructions executing in a background execution environment, based on entry operations associated with the entries of the respective first, second, and third topic objects, the displayed accumulated results arranged based on a relevance analysis of a cumulative set of metadata extracted from the first search results, the second search results, and the third search results.

18. A computer program product comprising a machine-readable storage device storing executable code that, when executed, causes at least one data processing apparatus to:
receive an explicit indication from a user of a user intent to provide at least one explicit user query, during use by the user of a first user application, the scratch pad application responding to the explicit indication from the user by dynamically initiating a display, after, and in response to, receipt of the explicit indication, of a separate input receiving display area that receives and displays only at least one user query object submission representing the at least one explicit user query provided by the user, during continuing use by the user of the first user application in a session of research, the separate input receiving display area being visually provided at a display point of invocation, dynamically selected by the user, of the explicit indication, wherein the separate input receiving display area is configured to receive the user query object submission via a drag operation;
obtain a plurality of queries associated with a plurality of user query object submissions accumulated by the user to the scratch pad application executing asynchronously as a background application to the first user application;
initiate one or more search requests to one or more search engines based on each one of the plurality of obtained queries;
obtain cumulative search results of the one or more search requests, the cumulative search results accumulated over the plurality of obtained queries;
obtain a set of accumulated results metadata based on an analysis of the accumulated cumulative search results, the set of accumulated results including a session-based group of accumulated results for the session of research;
determine an inferred cumulative user intent based on the accumulated results metadata, the inferred cumulative user intent including an inferred cumulative user intent based on the session-based group of accumulated results for the session of research; and
initiate a display of a summary of the cumulative search results based on a relevance analysis of the accumulated results metadata and using the inferred cumulative user intent based on the session-based group of accumulated results for the session of research.

19. The computer program product of claim 18, wherein:
the plurality of user query object submissions include one or more of:
- text query data,
- image data,
- sensory data, or
- audio data.

20. The computer program product of claim 18, wherein the executable code, when executed, causes the at least one data processing apparatus to:
initiate the display of the summary of the cumulative search results based on determining a set of presentation information based on one or more relevance analysis operations associated with the set of accumulated results metadata, based on a term frequency-inverse document frequency (tf-idf) ranking analysis based on the cumulative search results of the one or more search requests.

* * * * *